J. J. Weeks,
Mower.
No. 11735.
Patented Sep. 26, 1854.
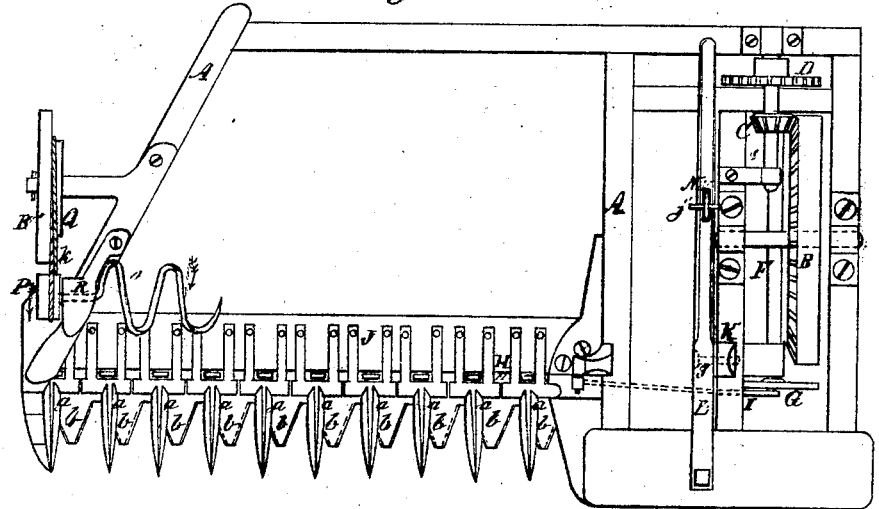
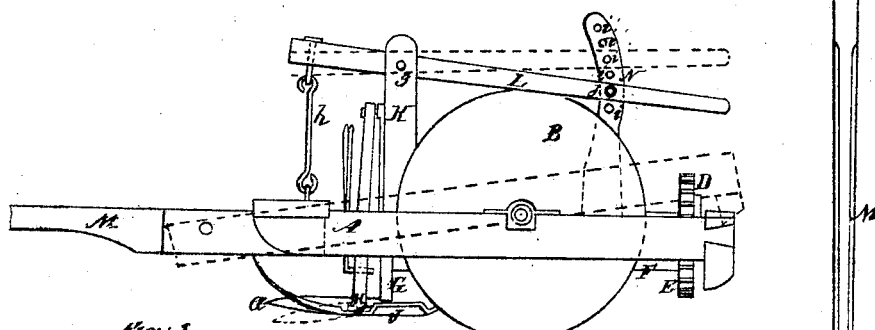
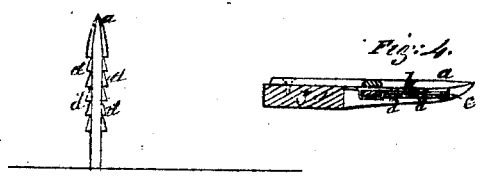

UNITED STATES PATENT OFFICE.

JOHN J. WEEKS, OF OYSTER BAY, NEW YORK.

IMPROVEMENT IN HARVESTERS OF GRAIN AND GRASS.

Specification forming part of Letters Patent No. 11,735, dated September 26, 1854.

*To all whom it may concern:*

Be it known that I, JOHN J. WEEKS, of Oyster Bay, in the county of Queens and State of New York, have invented certain new and useful Improvements in Reaping and Mowing Machines; and I do hereby declare that the following is a full, clear, and exact description of the same, reference being had to the annexed drawings, making a part of this specification, in which—

Figure 1 is a plan or top view of my improved machine. Fig. 2 is a side view of the same. Fig. 3 is an under view of one of the fingers. Fig. 4 is a side view of one of the fingers, the sickle-bar and front cross-bar of the frame being cut transversely. Fig. 5 is a front view of four fingers and a portion of the sickle.

Similar letters of reference indicate corresponding parts in the several figures.

This invention relates to certain new and useful improvements in reaping and mowing machines; and it consists, first, in the employment or use of a track-clearer of spiral form placed at the side of the machine, opposite to the side where the gearing is placed, and operating as will be hereinafter shown and described.

Second. My invention consists in having each tooth of the sickle work through two fingers, in combination with a peculiar manner of forming the teeth—viz., having the cutting-edges formed with alternate opposite bevels, as will be hereinafter described.

To enable others skilled in the art to make and use my invention, I will proceed to describe its construction and operation.

A represents a frame constructed in the usual manner and supported by two wheels, B B', B being the driving-wheel, and having cogs upon its inner side, (see Fig. 1,) said cogs gearing into a pinion, C, which by means of gearing D E communicate motion to a crank-shaft, F, to the crank-pulley G of which the sickle H is connected by a rod, I. (See Fig. 1.)

J is the front cross-bar of the frame, to which bar fingers $a$ are attached in the usual manner. The fingers $a$ are slotted, and the teeth $b$ of the sickle H work through the slots of the fingers, as is usual with many reapers, (see Figs. 4 and 5,) $c$ representing the slots. At the under edges of the slots of the fingers are notches $d$, (see Figs. 3, 4, and 5,) the notches being on each side of the several fingers. The teeth $b$ of the sickle are triangular or saw-shaped, as shown in Fig. 1, and the crank-pulley G, to which the connecting-rod I is attached, is of sufficient diameter to allow each tooth to work through two fingers. Every alternate tooth of the sickle is so beveled on its edges as to make its cutting-edges pass over the upper surfaces of the slots $c$ in the fingers, (see Fig. 5,) $e$ representing the teeth with their cutting-edges so formed. The intervening or remaining teeth, $f$, have their edges beveled in a reverse direction, so that their cutting-edges will pass over the lower surfaces of the slots $c$.

K, Figs. 1 and 2, is an upright secured to the frame A. On the upper part of said upright a lever, L, is secured by a pin, $g$, said pin being the fulcrum. The outer end of the lever L is attached by a link, $h$, to the inner end of the tongue or pole M of the machine.

N is a curved standard, which is attached to the frame A, and passes through a slot in the lever L. (See Figs. 1 and 2.) This standard N has holes $i$ made through it, through which holes a pin, $j$, passes. (Shown clearly in Fig. 1.)

O is the track-clearer, placed at the end of the machine, as shown in Fig. 1. This track-clearer is of spiral form, and may be formed of an iron or steel rod. On the outer end of the track-clearer there is a pulley, P, around which a band, $k$, passes, said band also passing around a pulley, Q, attached to the inner side of the wheel B'. (See Fig. 1.)

R is the bearing in which the track-clearer works. The track-clearer, it will be seen by referring to Fig. 1, is placed directly back of the sickle, so that the cut grass at that end of the frame will come in contact with it.

As the machine is drawn along the track-clearer O will rotate in the direction indicated by the arrow (see Fig. 1) and throw or convey the grass toward the center of the frame A, and a space will be left free from grass for the driving-wheel B to run in upon the return motion of the machine. The sickle H may be set the desired distance from the surface of the ground by regulating the lever L. (See Fig. 2.) When the inner end of the lever is raised the front part of the frame A, and consequently the sickle H, will be depressed, and the reverse is obtained by depressing the inner end of the lever. (See dotted lines, Fig. 2.) The lever L may be secured in the desired position by the pin $j$.

The cutting-edges of the teeth $b$ of the sickle being formed as described, and each tooth working through two fingers, prevents the sickle from being clogged or choked, because one portion of the teeth work over the upper surfaces of the slots $c$ and the other portion over the under surfaces, and consequently the slots will be kept perfectly free from all obstructions.

The notches $d$ at the sides of the fingers prevent the grass or grain from being forced outward toward the ends of the fingers while the teeth $b$ are acting upon it, and insure the perfect cutting of the grass.

I do not claim separately having the sickle-teeth working through two fingers, for this has been previously done.

Having thus described my invention, what I claim as new, and desire to secure by Letters Patent, is—

1. The track-clearer O, constructed in the form of a spiral or screw, and arranged and operating as herein shown and described.

2. Having each tooth of the sickle work through two of the fingers, in combination with the beveling of the cutting-edges of every alternate tooth, so that while one tooth shall have its cutting-edges on its upper face that next to it shall have its cutting-edges on its lower face, as herein shown and described.

JOHN J. WEEKS.

Witnesses:
ALLEN HAUXHURST,
WILLIAM ELY.